(12) United States Patent
Inoue et al.

(10) Patent No.: US 8,356,607 B2
(45) Date of Patent: Jan. 22, 2013

(54) SMOKING ARTICLE AND METHOD OF MANUFACTURING SAME, AND METHOD OF MANUFACTURING CARBON MONOXIDE REDUCING AGENT

(75) Inventors: Yasunobu Inoue, Yokohama (JP); Kiyohiro Sasakawa, Yokohama (JP); Kazunori Sugai, Yokohama (JP); Kenichi Nishimura, Tokyo (JP); Yoshio Nakahara, Tokyo (JP)

(73) Assignee: Japan Tobacco Inc., Tokyo (JP)

( * ) Notice: Subject to any disclaimer, the term of this patent is extended or adjusted under 35 U.S.C. 154(b) by 0 days.

(21) Appl. No.: 13/101,210

(22) Filed: May 5, 2011

(65) Prior Publication Data

US 2011/0203599 A1 Aug. 25, 2011

Related U.S. Application Data

(63) Continuation of application No. PCT/JP2009/068919, filed on Nov. 5, 2009.

(30) Foreign Application Priority Data

Nov. 6, 2008 (JP) ................................. 2008-285196

(51) Int. Cl.
    *A24D 1/02* (2006.01)
(52) U.S. Cl. .......................................... 131/365; 131/284
(58) Field of Classification Search ........................ None
    See application file for complete search history.

(56) References Cited

U.S. PATENT DOCUMENTS

| T889007 | I4 * | 8/1971 | Touey et al. ................... 131/331 |
| 2002/0062834 | A1* | 5/2002 | Snaidr et al. ................... 131/365 |
| 2003/0188758 | A1 | 10/2003 | Hajaligol et al. |
| 2004/0020504 | A1 | 2/2004 | Snaidr et al. |
| 2004/0250826 | A1 | 12/2004 | Li et al. |
| 2005/0279372 | A1 | 12/2005 | Sundar et al. |
| 2007/0240726 | A1 | 10/2007 | Sendo et al. |

FOREIGN PATENT DOCUMENTS

| JP | 2005-520509 A | 7/2005 |
| JP | 2005-527205 A | 9/2005 |
| JP | 2006-122793 A | 5/2006 |
| JP | 2007-527698 A | 10/2007 |
| JP | 2007-527782 A | 10/2007 |
| JP | 2008-502343 A | 1/2008 |
| WO | WO 2006/064704 A1 | 6/2006 |

OTHER PUBLICATIONS

T889,007 entire document.*
PCT/GB2007/00197 (WO 2007/104908).*
Form PCT/ISA/237 for PCT/JP2009/068919, dated on Feb. 2, 2010.
International Search Report for PCT/JP2009/068919, mailed on Feb. 16, 2010.

* cited by examiner

*Primary Examiner* — Michael J Felton
(74) *Attorney, Agent, or Firm* — Birch, Stewart, Kolasch & Birch, LLP

(57) ABSTRACT

A smoking article includes a carbon monoxide reducing agent including particles including a calcium aluminate represented by the formula $(CaO)_m(Al_2O_3)_n$, where $1/6 \leq m/n \leq 4/1$, wherein the particles have a BET specific surface area of 2 m²/g or more and less than 20 m²/g.

14 Claims, 3 Drawing Sheets

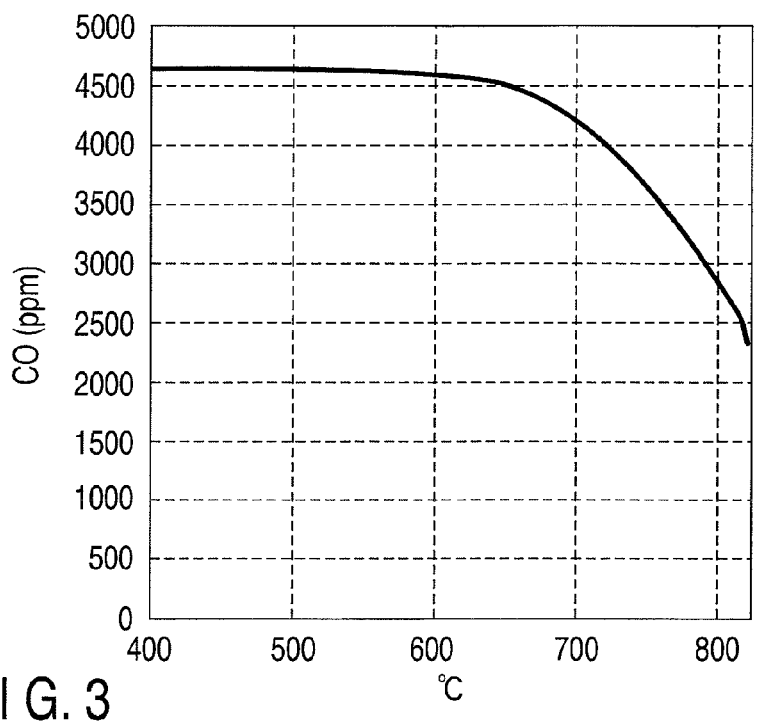
F I G. 3
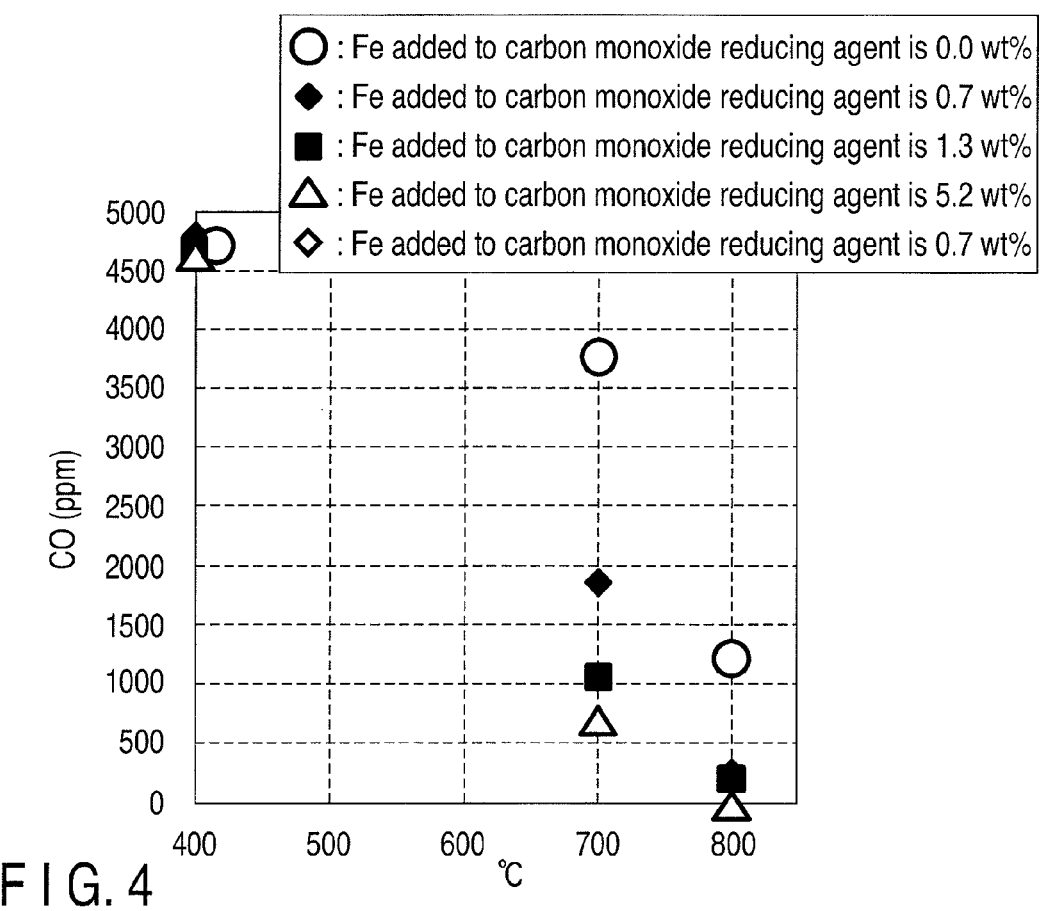
F I G. 4

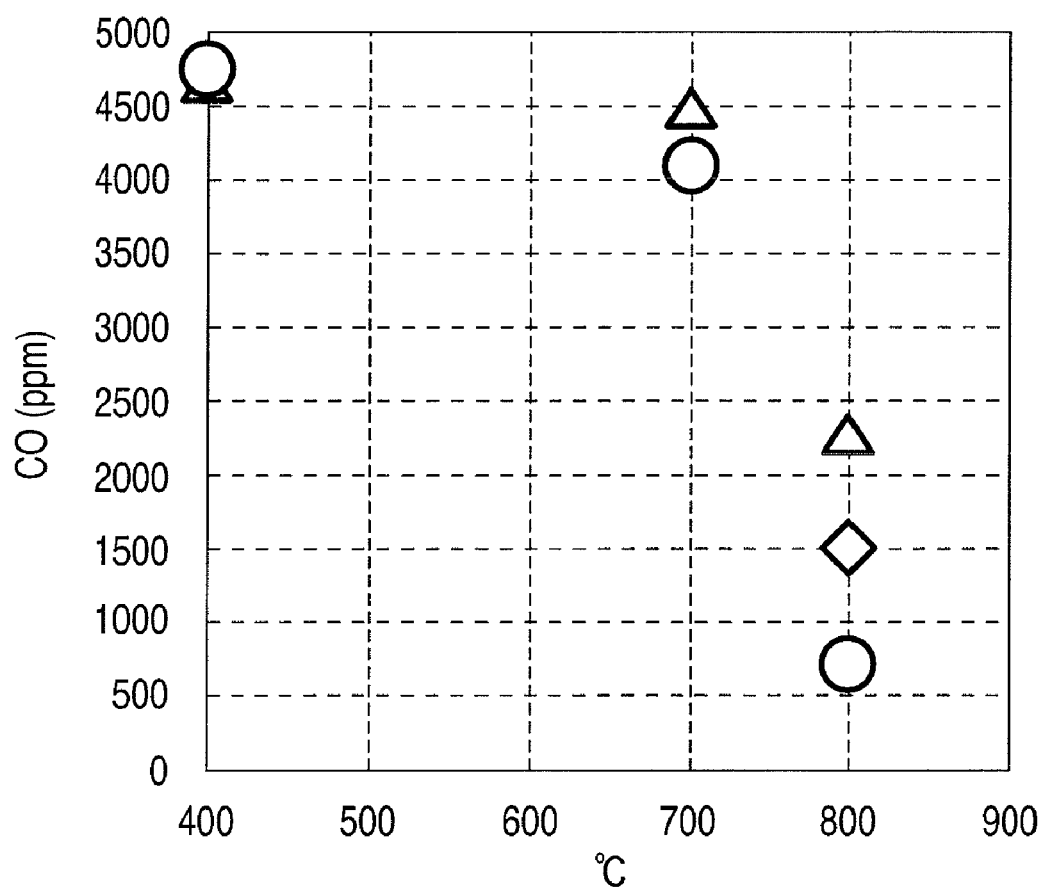
F I G. 5

SMOKING ARTICLE AND METHOD OF MANUFACTURING SAME, AND METHOD OF MANUFACTURING CARBON MONOXIDE REDUCING AGENT

CROSS-REFERENCE TO RELATED APPLICATIONS

This is a Continuation Application of PCT Application No. PCT/JP2009/068919, filed Nov. 5, 2009, which was published under PCT Article 21(2) in Japanese.

This application is based upon and claims the benefit of priority from prior Japanese Patent Application No. 2008-285196, filed Nov. 6, 2008, the entire contents of which are incorporated herein by reference.

BACKGROUND OF THE INVENTION

1. Field of the Invention

The present invention relates to a smoking article comprising a carbon monoxide reducing agent and a method of manufacturing the same, and a method of manufacturing the carbon monoxide reducing agent.

2. Description of the Related Art

Carbon monoxide that is generated during combustion of a smoking article is a substance that is preferable to be removed. Conventionally, attempts to reduce carbon monoxide included in mainstream smoke that is generated during smoking or in sidestream smoke during natural combustion have been done by incorporating a catalyst, an oxidant, an adsorbent and the like into a tobacco filler, a tobacco wrapping paper, a filter and the like.

For example, Jpn. PCT National Publication No. 2008-502343 discloses that silver oxide is used as a catalyst for oxidizing carbon monoxide. Jpn. PCT National Publication No. 2007-527782 and Jpn. PCT National Publication No. 2007-527698 disclose a catalyst comprising metal particles and/or a metal oxide of a nanoscale carried on a fibrous carrier or a high-surface area carrier. Jpn. PCT National Publication No. 2005-527205 discloses an oxyhydroxide compound that acts as an oxidizing agent for converting carbon monoxide to carbon dioxide, and exemplifies an oxyhydroxide compound of a transition metal and the like.

However, use of a large amount of a noble metal or a transition metal as a metal causes increase in the manufacture cost of a catalyst. Furthermore, use of nanoscale particles may cause problems of difficult handling in the manufacture of smoking articles, increase in costs for pulverization, and the like. On the other hand, milliscale particles having a large particle size are difficult to be included into or carried by a smoking article in the manufacture.

Meanwhile, Jpn. Pat. Appln. KOKAI Publication No. 2006-122793 discloses a catalyst including a composite oxide comprising calcium and aluminum as main components and also comprising iron as a catalyst for a shift reaction of water gas. In that publication, a catalyst comprising a composite oxide comprising calcium and aluminum (calcium aluminate) as a main component is manufactured by manufacturing a layered double hydroxide including calcium and aluminum in an alkali aqueous solution in advance, and sintering the product by heating.

It is known that calcium aluminate generally causes a hydration reaction when contacting with water and causes aggregation and crystal breakup. Since the catalyst in Jpn. Pat. Appln. KOKAI Publication No. 2006-122793 has a large BET specific surface area of 20 $m^2$/g or more, it has a very large contact surface area with water, and thus a hydration reaction proceeds rapidly from the surfaces of the catalyst particles and causes breakup of the crystal structure or coagulation of the composite oxide. As a result, the catalyst particles are deactivated within a short time period.

BRIEF SUMMARY OF THE INVENTION

The present invention aims at providing a smoking article comprising a carbon monoxide reducing agent that is in the form of particles, can be manufactured at low costs, has good handling property on the manufacture of a smoking article, and can reduce the amount of carbon monoxide that is generated by combustion of the smoking article for a relatively long time period, and a method of manufacturing the same. Furthermore, the present invention aims at providing a method of manufacturing a carbon monoxide reducing catalyst having a suitable BET specific surface area and being excellent in handling.

According to a first aspect of the present invention, there is provided a smoking article comprising a carbon monoxide reducing agent comprising particles comprising a calcium aluminate represented by the formula $(CaO)_m(Al_2O_3)_n$, where $1/6 \leq m/n \leq 4/1$, wherein the particles have a BET specific surface area of 2 $m^2$/g or more and less than 20 $m^2$/g.

According to a second aspect of the present invention, there is provided a method of manufacturing the smoking article, comprising: manufacturing a tobacco filler; manufacturing a tobacco wrapping paper; adding water, a swelling agent and a flavor to the tobacco filler; forming a tobacco column from the tobacco filler; and wrapping the tobacco column in the tobacco wrapping paper to form a tobacco rod, wherein the carbon monoxide reducing agent is added to the tobacco filler and/or tobacco wrapping paper in any of the steps.

According to a third aspect of the present invention, there is provided a method of manufacturing a carbon monoxide reducing agent, comprising adding an additional metal other than calcium and aluminum on surfaces of particles comprising a calcium aluminate represented by the formula $(CaO)_m(Al_2O_3)_n$, where $1/6 \leq m/n \leq 4/1$, wherein the particles have a BET specific surface area of 2 $m^2$/g or more and less than 20 $m^2$/g, by a wet process using a non-aqueous solvent.

Calcium carbonate and aluminum oxide that are raw materials of calcium aluminate included in the carbon monoxide reducing agent of the present invention are relatively inexpensive and the supplies thereof are large. Therefore, according to the present invention, a carbon monoxide reducing catalyst can be manufactured inexpensively. Since the carbon monoxide reducing agent of the present invention has a suitable size, it is excellent in handling on the preparation of smoking articles. Furthermore, since the particles of the carbon monoxide reducing catalyst are manufactured in a non-aqueous system in one aspect of the present invention, breakup of the crystal structure and coagulation of the calcium aluminate can be avoided, and thus the carbon monoxide reducing effect of the catalyst particles is not impaired during the manufacturing processes.

BRIEF DESCRIPTION OF THE SEVERAL VIEWS OF THE DRAWING

FIG. 3 is a graph showing the relationship between the temperature and the outlet carbon monoxide concentration for Sample 1.

FIG. 4 is a graph showing the effect of the amount of Fe added to the carbon monoxide reducing agent on carbon monoxide reducing ability.

FIG. 5 is a graph showing the relationship between the temperature and the outlet carbon monoxide concentration for Samples 2, 1 and 7.

DETAILED DESCRIPTION OF THE INVENTION

[Definitions of Terms]

In the present invention, the term "mainstream smoke" means a mixture (smoke) of gas that passes through a tobacco rod and ejects through a cigarette end during smoking of a smoking article (cigarette).

The term "sidestream smoke" means smoke that is generated from a combustion end of a cigarette during natural combustion of the cigarette.

Hereinafter the present invention is described in more detail.

The smoking article of the present invention, specifically a cigarette, comprises a carbon monoxide reducing agent comprising a plurality of particles comprising a calcium aluminate represented by the formula $(CaO)_m(Al_2O_3)_n$, where $1/6 \leq m/n \leq 4/1$. The BET specific surface area of each particle is $2 \text{ m}^2/\text{g}$ or more and less than $20 \text{ m}^2/\text{g}$.

The carbon monoxide reducing agent of the present invention can be obtained by mixing m mols of calcium oxide (CaO) powder and n mols of aluminum oxide ($Al_2O_3$) powder, and sintering the mixture at from 1,250° C. to 1,350° C.

It has been found that the carbon monoxide reducing agent of the present invention improved carbon monoxide reducing ability by comprising the calcium aluminate of the formula $(CaO)_m(Al_2O_3)_n$ having a molar ratio of $1/6 \leq m/n \leq 4/1$. It is known that a calcium aluminate encloses an anionic radical such as a superoxide anion radical at an ordinary temperature and releases the enclosed anionic radical at approximately 600° C., and also intakes oxygen in ambient air at a temperature of 600° C. or higher and consequently generates and releases the anionic radical. Also in the present invention, it is considered that the conversion of CO in mainstream smoke or sidestream smoke to $CO_2$ is promoted by a released or generated anionic radical, whereby carbon monoxide is reduced.

Figure 1:
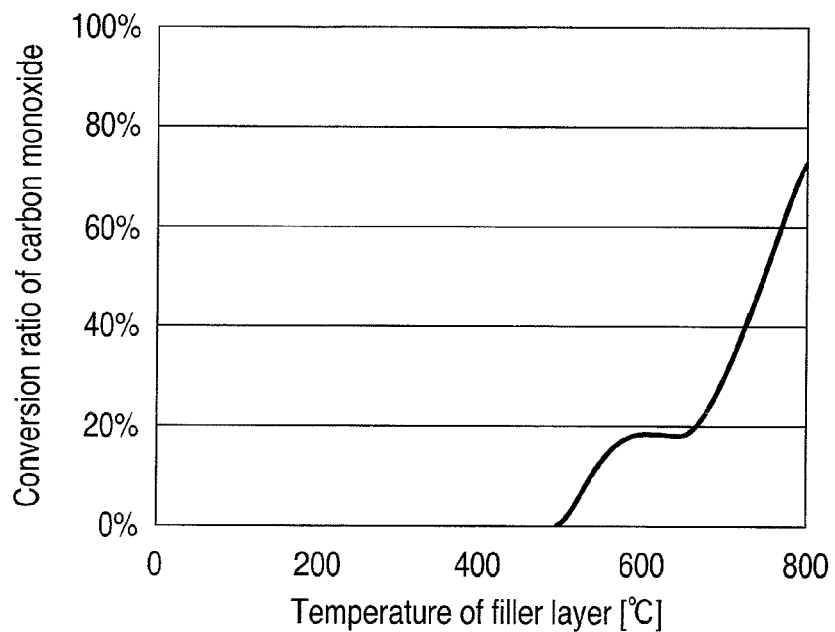
FIG. 1 is a graph showing the conversion ratio of carbon monoxide in the circulation test of model gas comprising carbon monoxide.

FIG. 1 shows the relationship between the temperature of the filling layer of the carbon monoxide reducing agent and the conversion ratio of carbon monoxide.

A carbon monoxide reducing agent comprising $(CaO)_m (Al_2O_3)_n$, where m/n=12/7, and 2% by weight of Fe as an additional metal and having a BET specific surface area of $10 \text{ m}^2/\text{g}$ was filled in a tube having an inlet and an outlet of gas. As model gas, mixed gas comprising 4,500 ppm of carbon monoxide, 20,000 ppm of oxygen and a balance of nitrogen was passed through the tube at 600 mL/min and the amount of carbon monoxide in the model gas at the gas outlet was measured by an IR analyzer to calculate the conversion ratio of carbon monoxide. As shown in FIG. 1, it was confirmed that the conversion ratio of carbon monoxide was increased when the filling layer temperature was from 450° C. to 600° C., and that when the temperature is 700° C. or higher, the conversion ratio of carbon monoxide was increased again. It is considered that an anionic radical from the carbon monoxide reducing agent is involved in the increase in the conversion ratio of carbon monoxide at from 450° C. to 600° C. Furthermore, it is considered that an anionic radical generated by intaking oxygen in the ambient air is involved in the increase of the conversion ratio of carbon monoxide at a temperature of 600° C. or higher.

A general cigarette has a combustion temperature of approximately 600° C. during natural combustion, or of approximately 800° C. during smoking. As mentioned above, the carbon monoxide reducing agent used for the smoking article of the present invention can significantly reduce carbon monoxide at a temperature of from 600 to 800° C.

The calcium aluminate particles that constitute the carbon monoxide reducing agent of the present invention have a BET specific surface area of $2 \text{ m}^2/\text{g}$ or more and less than $20 \text{ m}^2/\text{g}$.

Here, the specific surface area is defined as a ratio of the surface area ($m^2$) of the particles per a weight (g). Since a particle weight is generally reduced in accordance with reduction in a particle size, particles having a smaller particle size tend to have a larger specific surface area. The particle size of the particles having a BET specific surface area of $2 \text{ m}^2/\text{g}$ is 5 μm, and is 0.5 μm at $20 \text{ m}^2/\text{g}$. The surfaces of the carbon monoxide reducing agent (calcium aluminate) particles serve as release sites of radicals that contribute to reduce carbon monoxide. In addition, in order to exhibit good radical releasing ability, it is preferable that the carbon monoxide reducing agent (calcium aluminate) particles have a large surface area to some extent. For example, when the BET specific surface area is less than $2 \text{ m}^2/\text{g}$, it tends to not function sufficiently in reducing carbon monoxide due to a small size of the radical releasing site. On the other hand, it is preferable that the calcium aluminate particles have a large particle size to some extent. For example, when the BET specific surface area is more than $20 \text{ m}^2/\text{g}$, the particles of the carbon monoxide reducing agent become those of a nanosize and become difficult to be handled. Furthermore, since the carbon monoxide reducing agent of the present invention has the above-mentioned BET specific surface area, the carbon monoxide reducing ability is not lowered for a relatively long time period even if it contacts with tobacco smoke (specifically, mainstream smoke) comprising moisture. Moreover, when the carbon monoxide reducing agent is once poisoned by water, the function of reducing carbon monoxide can be restored by placing the agent under a temperature atmosphere of about 500° C.

The calcium aluminate particles that constitute the carbon monoxide reducing agent of the present invention have a BET specific surface area of preferably from 5 to $15 \text{ m}^2/\text{g}$, more preferably about $10 \text{ m}^2/\text{g}$. The BET specific surface area can be obtained by using an automatic specific surface area/pore distribution measurement apparatus BELSORP-mini (manufactured by BELL Japan, Inc.) according to a nitrogen-adsorption single point method.

The carbon monoxide reducing agent of the present invention may further comprise an additional metal other than calcium and aluminum. By having such metal, the carbon monoxide reducing ability tends to be further increased. The additional metal may be present on the surfaces of the calcium aluminate particles and/or in the calcium aluminate particles. It is preferable that the additional metal is selected from the group consisting of Au, Pt, Mg, Si, P, K, Ti, Cr, Mn, Fe, Co, Ni, Cu, Zn, Zr, Mo, Pd, Ag and mixtures thereof. The additional metal is more preferably selected from the group consisting of Ti, Fe, Cu, Zn and mixtures thereof, and is particularly preferably Fe.

It is preferable that the additional metal is present in an amount of 0.1% by weight or more and less than 10% by weight in total with respect to the weight of the carbon monoxide reducing agent. When the amount of the additional metal is less than 0.1% by weight, the carbon monoxide reducing ability tends not to be significantly improved as compared to the case when the additional metal is absent. Alternatively, when the amount of the additional metal is 10% by weight or more, the carbon monoxide reducing ability is not improved significantly and the manufacture costs are increased as compared to the case when the amount is less than 10% by weight. It is preferable that the additional metal is present in an amount of from 0.1% by weight to 5% by weight in total based on the weight of the carbon monoxide reducing agent.

The procedure for imparting the additional metal to the carbon monoxide reducing agent comprises (i) further adding powder of a compound of the additional metal to the powder of calcium oxide and powder of aluminum oxide that are used for manufacturing the calcium aluminate of the present invention, mixing, and sintering the mixture at a temperature of from 1,250° C. to 1,350° C. in a similar manner, (ii) applying a solution or suspension liquid of a powder of the additional metal to the surface of the calcium aluminate particles that are obtained in advance as mentioned above, and drying, and the combination of the procedures (i) and (ii). In either case, the compound of the additional metal used comprises an oxide, a sulfate, a nitrate.

In the procedure (ii), it is preferable that the additional metal is added by a wet process using a non-aqueous system. Namely, the additional metal to be added to the particles is used by dissolving a compound comprising the metal in a non-aqueous solvent. The metal compound may be one that can be dissolved in a non-aqueous solvent, for example, an organic solvent, and examples may include iron sulfate, iron chloride, iron nitrate as mentioned above, and the like. As the non-aqueous solvent, an organic solvent can be used, and is not specifically limited as long as it can dissolve the metal compound. Specifically, it is preferable to use acetone or ethanol. By using the non-aqueous solvent, breakup of the crystal structure and coagulation of the calcium aluminate that may occur when an aqueous solvent is used can be prevented. Therefore, the carbon monoxide reducing ability is not impaired by poisoning of the particles by water.

Furthermore, when the metal compound is added to the raw materials of the particles before sintering, or is added to the surfaces of the particles after sintering, it is desirable that the metal compound is dispersed more uniformly so as to make the function of the obtained carbon monoxide reducing agent uniform. Note that, when a non-aqueous solvent having a lower boiling point than that of water is used, the solvent is removed easily, and thus a treatment for addition to the raw materials of the particles before sintering, or a treatment for addition to the surface of the particles after sintering can be advantageously performed rapidly. Since only the solvent can be collected easily by dissolving the metal compound in the non-aqueous solvent, and mixing the solution with the raw materials of the particles before sintering or mixing the solution with the particles after sintering and using a general technique such as an aspirator, particles on which the metal compound is dispersed uniformly can be obtained readily.

Namely, according to the present invention, a method of manufacturing a carbon monoxide reducing agent comprising: adding a metal other than calcium and aluminum on the surfaces of particles comprising a calcium aluminate represented by the formula $(CaO)_m(Al_2O_3)_n$, where $1/6 \leq m/n \leq 4/1$, wherein the particles have a BET specific surface area of 2 m$^2$/g or more and less than 20 m$^2$/g, by a wet process using a non-aqueous solvent, is also provided.

The particles comprising the calcium aluminate that comprises or does not comprise the additional metal can be adjusted to have a BET specific surface area of 2 m$^2$/g or more and less than 20 m$^2$/g by sintering a powder mixture of the raw materials that comprises or does not comprise the additional metal, and pulverizing the sintered product by using a dry ball mill and a wet sand mill.

Although the raw materials for the calcium aluminate may comprise impurities of an alkali metal and an alkaline earth metal such as potassium and magnesium, the impurities can be accepted as long as they are in the range as present in commercially available raw materials, specifically less than 2% by weight.

The carbon monoxide reducing agent of the present invention can be added to, for example, the tobacco filler or tobacco wrapping paper of the smoking article of the present invention. The addition amount when the carbon monoxide reducing agent is added to the tobacco filler is preferably from 1 to 80% by weight of the tobacco filler, more preferably, from 50 to 80% by weight of the tobacco filler. On the other hand, the addition amount when the carbon monoxide reducing agent is added to the tobacco wrapping paper is preferably from 1 to 60% by weight of the tobacco wrapping paper, more preferably from 20 to 50% by weight of the tobacco wrapping paper.

The smoking article of the present invention is, for example, a cigarette. A cigarette generally has a tobacco rod that includes a tobacco filler rolled up in a cigarette wrapping paper in the form of a column. The tobacco rod generally has a circumferential length of from 17 mm to 26 mm and a length of from 49 mm to 90 mm. A general filter can be attached to a proximal end of the tobacco rod (i.e., the downstream end of the inhalation direction) by a general method by using a tipping paper.

The smoking article of the present invention can be manufactured by a method of manufacturing a smoking article comprising: manufacturing a tobacco filler; manufacturing a tobacco wrapping paper; adding water, a swelling agent and a flavor to the tobacco filler; forming a tobacco column using the tobacco filler; and wrapping the tobacco column in a wrapping paper to form a tobacco rod, wherein the carbon monoxide reducing agent is added in any of the steps.

The manufacture method described above is a method of manufacturing a general tobacco except that the carbon monoxide reducing agent of the present invention is added. The tobacco filler comprises, for example, cut tobacco. A flavor to be added to the tobacco filler may be any flavor used for a cigarette and the like, and examples may include menthol and the like. As the swelling agent, for example, glycerol, propylene glycol, or the like may be used.

In order to add the carbon monoxide reducing agent to the smoking article of the present invention, the carbon monoxide reducing agent can be dispersed in water or a non-aqueous solvent to form slurry. For example, when the carbon monoxide reducing agent is added to the tobacco filler, the slurry of the carbon monoxide reducing agent is added to the cut tobacco by spraying or sprinkling in any of the above-mentioned steps. When the agent is added to the tobacco wrapping paper, the agent is added to pulp that is a raw material for the tobacco wrapping paper by incorporating, spraying or sprinkling the agent in the form of the slurry in manufacturing the tobacco wrapping paper.

Alternatively, as a tobacco filler other than the cut tobacco, cut of a tobacco sheet that is formed by mixing cut tobacco, a tobacco fine powder, a binder, an aerosol-generating source and the like in a solvent to give slurry, and papermaking and rolling the slurry can also be used. When the carbon monoxide reducing agent is added to the shreds of the tobacco sheet, it is added by kneading the slurry of the carbon monoxide reducing agent with slurry of the raw materials of the tobacco sheet and papermaking and rolling the kneaded product, or by spraying or sprinkling the slurry of the carbon monoxide reducing agent on the formed tobacco sheet.

EXAMPLES

Hereinafter the present invention is described with referring to Examples, but the present invention is limited by these Examples.

Example 1

[Preparation of Carbon Monoxide Reducing Agent]

The following carbon monoxide reducing agents were prepared as shown in the following Table 1:
(1) particles including a calcium aluminate represented by $(CaO)_m(Al_2O_3)_n$, where $1/6 \leq m/n \leq 4/1$ (Samples 1 to 5, 7 and 8),
(2) particles comprising a calcium aluminate represented by $(CaO)_m(Al_2O_3)_n$, where $1/6 \leq m/n \leq 4/1$ and an additional metal (added before sintering) (Samples 6, 9, 10 and 16),
(3) particles obtained by adding a metal to the surfaces of the particles of (1) (added after sintering) (Samples 11 and 13 to 15), and
(4) particles obtained by adding a metal to the surfaces of the particles of (2) (added after sintering) (Sample 12).

These carbon monoxide reducing agents have the BET specific surface areas as shown in Table 1.

calcium carbonate powder and the low-purity aluminum oxide powder and the BET specific surface area were adjusted as described in Table 1.

Preparation of Samples 6, 9 and 10

Samples 6, 9 and 10 were obtained in a similar preparation method to that for Sample 1, except that the molar ratio of the calcium carbonate powder and the low-purity aluminum oxide powder described in Table 1 was used, iron oxide (II) and titania were added to the raw materials of the particles before sintering, and that the BET specific surface area was adjusted as described in Table 1.

Preparation of Sample 8

A calcium carbonate powder and a high purity (>99% or more) aluminum oxide powder were weighed so as to have a molar ratio of 12:7, and mixed by using a powder mixer. The mixed powder was put into a crucible, and sintered by heating at 1,350° C. for 6 hours. Thereafter, the product was cooled to room temperature under an atmosphere of aeration with oxygen to give particles comprising a calcium aluminate. The obtained particles were pulverized, and the BET specific surface area of the particles was adjusted to about 9.5 m$^2$/g by using a dry ball mill and a wet sand mill. Namely, Sample 8 is free from iron element.

Preparation of Samples 11, 13 and 14

The same calcium aluminate particles as that used for Sample 8 were adjusted to have the BET specific surface areas

TABLE 1

| | | Molar ratio of $(CaO)_m/$ $(Al_2O_3)_n$ m/n | BET specific surface area (m$^2$/g) | Added before sintering | Added after sintering | Additional metal | Ratio of additional metal (wt %) | Reduction ratio of carbon monoxide Apparent CO reduction ratio |
|---|---|---|---|---|---|---|---|---|
| Comparative Example 1 | | — | — | — | — | — | — | 0% |
| Examples | Sample 1 | 12/7 | 2.3 | — | — | — | — | 12% |
| | Sample 2 | 3/1 | 3.4 | — | — | — | — | 14% |
| | Sample 3 | 1/1 | 3.4 | — | — | — | — | 14% |
| | Sample 4 | 1/2 | 4.2 | — | — | — | — | 12% |
| | Sample 5 | 12/7 | 10.6 | — | — | — | — | 16% |
| | Sample 6 | 12/7 | 2.4 | ○ | — | Ti, Fe | 1.0, 0.8 | 15% |
| | Sample 7 | 1/6 | 3.2 | — | — | — | — | 13% |
| | Sample 8 | 12/7 | 9.5 | — | — | — | — | 15% |
| | Sample 9 | 12/7 | 8.9 | ○ | — | Ti, Fe | 2.0, 1.5 | 20% |
| | Sample 10 | 12/7 | 11.2 | ○ | — | Ti, Fe | 2.0, 1.5 | 25% |
| | Sample 11 | 12/7 | 10.1 | — | ○ | Fe | 1.3 | 30% |
| | Sample 12 | 12/7 | 8.7 | ○ | ○ | Ti, Fe | 2.0, 2.8 | 24% |
| | Sample 13 | 12/7 | 10.0 | — | ○ | Fe | 0.7 | 20% |
| | Sample 14 | 12/7 | 10.0 | — | ○ | Fe | 5.2 | 45% |
| | Sample 15 | 1/2 | 8.7 | — | ○ | Fe | 1.0 | 17% |
| | Sample 16 | 12/7 | 10.0 | ○ | — | Fe | 0.7 | 18% |

Preparation of Sample 1

Calcium carbonate powder and low-purity aluminum oxide powder were weighed so that the molar ratio became 12:7 and mixed by using a powder mixer. The mixed powder was put into a crucible, and sintered by heating at 1,350° C. for 6 hours. Thereafter, the product was cooled to room temperature under an atmosphere of aeration with oxygen to give particles comprising a calcium aluminate. The obtained particles were pulverized, and the BET specific surface area of the particles was adjusted to about 2.3 m$^2$/g by using a dry ball mill and a wet sand mill.

Preparation of Samples 2 to 5 and 7

Samples 2 to 5 and 7 were obtained in a similar preparation method to that for Sample 1, except that the molar ratio of the shown in Table 1, respectively. An ethanol solution of a metal iron compound was added thereto, mixed with stirring and dried to give Samples 11, 13 and 14 in which the metal had been added to the surfaces of the particles.

Preparation of Sample 12

The BET specific surface area of particles that were prepared according to a similar method to that for Samples 6, 9 and 10 was adjusted to 8.7 m$^2$/g. A solution obtained by dissolving iron nitrate in ethanol was sprayed on the surfaces of the particles, and heated again up to 600° C. in the atmosphere to give Sample 12 in which a metal had been added to the surfaces of the particles.

Preparation of Sample 15

The sample was prepared according to a similar method to that for Sample 11, except that the time for pulverizing the sintered particles was shortened and the BET specific surface area was adjusted to 8.7 m²/g.

Preparation of Sample 16

Sample 16 was prepared according to a similar method to that for Sample 1, except that iron oxide (II) was added to the raw materials of the particles before sintering, and the BET specific surface area was adjusted to 10.0 m²/g after sintering.

[Addition of Sample]

Each of the carbon monoxide reducing agents (Samples 1 to 16) was dispersed uniformly in 200 mg of cut tobacco blend. The cut tobacco blend to which the carbon monoxide reducing agent had been added was filled in a quartz tube (inner diameter=8 mm) by a length of 20 mm so that the added cut tobacco blend had voids to a similar extent to that in a cigarette (a void fraction of about 50%).

[Evaluation of CO Reduction Ratio]

The quartz tube in which the sample had been filled was put into an infrared image furnace. Dry air was passed at a velocity of 1000 mL/min so that the cross-sectional average velocity became similar to that of a standard smoking condition (17.5 mL/sec) for a cigarette, and the temperature was raised from room temperature to 800° C. to generate smoke from the cut tobacco. A Cambridge filter and a gas bag were connected to collect smoke that was generated during heating of the cut tobacco blend to which the carbon monoxide reducing agent had been added. Namely, after removing the particle phase of the smoke by the filter, only the gas phase components of the smoke were collected in the gas bag. As used herein, the term "gas phase components" means components that are contained in smoke that is generated when a tobacco filler is combusted, and passes the Cambridge filter. The concentrations of carbon monoxide and oxygen in the collected smoke were analyzed with GC-TCD (Agilent 3000 Micro GC). Since the amount of combusted cut tobacco blend varies depending on the samples, the concentration of the released carbon monoxide may vary. Therefore, in order to eliminate the variation depending on the samples, assuming that the combustion amount of the cut tobacco blend is proportional to the consumed amount of oxygen, the carbon monoxide reduction ratio was evaluated according to the following formula.

Apparent CO reduction ratio=[1−(actual amount of generated carbon monoxide)/(amount of generated carbon monoxide as estimated from consumed amount of oxygen)]×100

It can be evaluated that the higher the apparent carbon monoxide reduction ratio calculated by the above-mentioned formula is, the more excellent the carbon monoxide reducing ability is.

The apparent carbon monoxide reduction ratio using the above-mentioned formula was measured for Samples 1 to 16. Furthermore, for comparison, the carbon monoxide reducing ability was evaluated for a sample comprising only the cut tobacco blend (Comparative Example 1) in a similar manner to that for Samples 1 to 16. The evaluation results are shown in Table 1.

It was confirmed from these results that a smoking article by which the carbon monoxide concentration in smoke is reduced can be obtained by adding a carbon monoxide reducing agent comprising a calcium aluminate to cut tobacco. Specifically, the carbon monoxide reducing agent in which the molar ratio m/n of $(CaO)_m(Al_2O_3)_n$ was 12/7 was excellent in handling.

Furthermore, it is understood from the comparison of Sample 8 with Samples 6, 9 to 14 and 16 that the carbon monoxide reduction ratio is further increased when the metal compound is added. It is understood from the comparison of Sample 13 with Sample 14 that a high carbon monoxide reduction ratio can be achieved by adjusting the amount of iron as the metal to be incorporated in the calcium aluminate. In addition, it is understood from the comparison of Sample 13 with Sample 16 that the carbon monoxide reducing ability tends to be improved more when iron is added after sintering.

Example 2

A cigarette was prepared by using a tobacco wrapping paper to which the carbon monoxide reducing agent of the present invention had been added, and the effect of reducing the carbon monoxide concentration of the cigarette was measured. Here, the carbon monoxide reducing agent is used substantially as a wrapping paper filler for the tobacco wrapping paper.

[Preparation of Sample Cigarette]

145 g of the carbon monoxide reducing agent (Sample 14) and 15 g of flax pulp (Lincell) were added to 2,000 g of ethanol and stirred to give slurry. At this time, when the sample concentration is low (the concentration is about 1%), the slurry can be generated by dispersing the carbon monoxide reducing agent and flax pulp in water. However, when the sample concentration was high as in the present example (the concentration was about 7%), the carbon monoxide reducing agent and flax pulp could not be dispersed in water, and thus it was necessary to use an organic solvent (for example, ethanol). By casting the slurry in the form of a sheet, or flowing the slurry on a tool for preparing hand-made paper on which stainless metal meshes of 16 meshes and 200 meshes had been superposed, a tobacco wrapping paper having a basis amount of 50 g/m² was prepared.

Using a tobacco hand-roller (Rizla), 750 mg of cut tobacco blend were formed into a column having a diameter of 8 mm and a length of 59 mm to form a tobacco rod. The tobacco rod was wrapped with the tobacco wrapping paper, and a filter plug was connected by a tipping paper to prepare a sample cigarette.

[Measurement of Carbon Monoxide Concentration-Reduction Ability]

Using the cigarette, the carbon monoxide concentration was measured. The cigarette was combusted according to the standard smoking condition of ISO. Namely, the cigarette was puffed by an automatic smoking machine under conditions of 2 seconds per a minute (at intervals of 58 seconds), 35 mL of puff every time, and a cigarette butt length of 23 mm, and mainstream smoke was collected. The gas phase components in the mainstream smoke were collected in a gas bag and analyzed by using GC-TCD (Agilent 3000 Micro GC).

For comparison, using a tobacco wrapping paper that was prepared in a similar method to that of Example 2, except that calcium carbonate was used instead of the carbon monoxide reducing agent (Comparative Example 2), the carbon monoxide concentration was measured in a manner similar to that of Example 2.

The carbon monoxide concentration in mainstream smoke of the cigarette of Example 2 was reduced by 20% as compared to that of Comparative Example 2. Further, the oxygen concentration that was consumed during smoking was calculated from the difference of the oxygen concentration in mainstream smoke and the oxygen concentration in the air. As a result, the concentration of consumed oxygen in Example 2 was 14% less than that in Comparative Example 2. From these results, it could be confirmed that a smoking article such as a cigarette by which the carbon monoxide concentration in smoke is reduced can be obtained by adding the carbon monoxide reducing agent comprising particles comprising the calcium aluminate and the metal other than calcium and aluminum to the tobacco wrapping paper.

Example 3

Using a cigarette that was prepared from the tobacco filling sheet to which the carbon monoxide reducing agent of the present invention had been added, an effect of reducing the carbon monoxide concentration was measured.

[Preparation of Sample Cigarette]

70% by weight of the carbon monoxide reducing agent (Sample 14 of Example 1), 20% by weight of glycerin and 10% by weight of a binder were mixed to prepare slurry. The slurry was casted on a substrate, and subjected to drying and cutting to prepare a tobacco filling sheet.

Using a tobacco filler in which this tobacco filling sheet had been incorporated by 30% by weight with respect to cut tobacco blend, a tobacco rod formed into a columnar shape having a diameter of 8 mm and a length of 59 mm was prepared by a tobacco hand-roller (Rizla). The tobacco rod was wrapped with a cigarette wrapping paper, and a filter plug was connected thereto with a tipping paper to prepare a sample cigarette.

The carbon monoxide concentration when the cigarette was combusted was measured. The cigarette was combusted according to the standard smoking condition of ISO. Namely, the cigarette was puffed by an automatic smoking machine under conditions of 2 seconds per 1 minute (interval: 58 seconds), 35 mL of puff every time and a cigarette butt length of 23 mm, and mainstream smoke was collected. The gas phase components in the mainstream smoke were collected in a gas bag and analyzed with GC-TCD (Agilent 3000 Micro GC).

For comparison, using a cigarette that was prepared in a similar method to that of Example 3, except that a tobacco sheet was prepared by using only cut tobacco blend and used as a tobacco filler (Comparative Example 3), the carbon monoxide concentration during combustion of the cigarette was measured.

The carbon monoxide concentration in the mainstream smoke was reduced by 10% by weight in the cigarette of Example 3 as compared to Comparative Example 3. Furthermore, when the concentration of oxygen that was consumed during smoking was calculated from the difference between the oxygen concentration in the mainstream smoke and the oxygen concentration in the air, the concentrations of the consumed oxygen were not different between the Example and Comparative Example. It was confirmed from these results that a smoking article such as a cigarette by which the carbon monoxide concentration in smoke is reduced can be obtained by using a carbon monoxide reducing agent including a compound obtained by adding a metal other than calcium and aluminum to a calcium aluminate for a tobacco filling sheet.

Example 4

The effect of the BET specific surface area on the carbon monoxide reducing ability was evaluated by using Sample 5 and Sample 1 of Example 1.

[Structural Analysis of Sample]

When Sample 5 was subjected to an elemental analysis by using an X-ray diffractometer (RAD RB RU-200, manufactured by Rigaku Corporation), it was identical with the crystal structure data of mayenite having the formula $(CaO)_{12}(Al_2O_3)_7$. The result shows that the sample comprises mayenite as a main component. The measurement conditions for XRD were as follows: (X-ray Target: Cu K-Alpha Load: 40 kV-80 mA Slit Div: 1 deg Rec: 0.3 mm Scatt: 1 deg Filter: Graphite monochro Detecter: SC Scan Speed: 4 deg/min Step Sampling: 0.02 deg).

[Measurement of Carbon Monoxide Reducing Ability]

The carbon monoxide reducing ability of Sample 5 was tested as follows. 50 mg of Sample 5 was collected, dispersed uniformly in 80 mg of glass wool, and filled in a quartz tube having an inner diameter of 8 mm. While passing nitrogen comprising about 5,000 ppm of carbon monoxide in the quartz tube at a velocity of 600 mL/min, the temperature of the filled part of the glass wool was raised from an ordinary temperature to 800° C. by heating from outside. At that time, the composition of the gas from the outlet of the quartz tube was measured by an on-line measurement using an IR analyzer (manufactured by HORIBA). Similar operations were performed for Sample 1. The relationships between the temperature and the outlet carbon monoxide concentration for Sample 5 and Sample 1 are shown in FIGS. 2 and 3, respectively.

Figure 2:
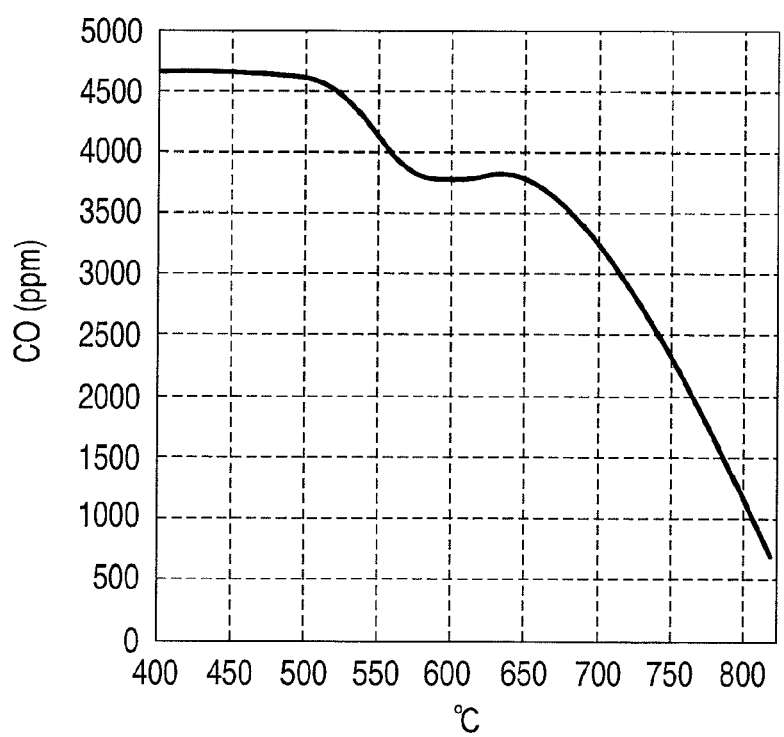
FIG. 2 is a graph showing the relationship between the temperature and the outlet carbon monoxide concentration for Sample 5.

As is apparent from FIGS. 2 and 3, it was found that carbon monoxide was reduced more effectively when Sample 5 having a larger BET specific surface area was used, as compared to the case when Sample 1 was used.

Example 5

The effect of the amount of the metal added to the carbon monoxide reducing agent on the carbon monoxide reducing ability was evaluated by using Samples 8, 11, 13 and 14 of Example 1. The amounts of the metal included in these samples were quantified as follows according to an SEM-EDX method (JSM-7500FA, manufactured by JEOL). The results of quantification are shown in the following Table 2.

TABLE 2

Weight constitutional ratios of amounts of metal elements by SEM-EDX for samples 13, 11, 14 and 8 (% by weight)

| | Sample | | | |
|---|---|---|---|---|
| Element | Sample 13 | Sample 11 | Sample 14 | Sample 8 |
| Al | 25.1 | 25.0 | 23.8 | 23.0 |
| Ca | 35.2 | 34.8 | 34.1 | 38.6 |
| Fe | 0.6 | 1.2 | 3.2 | |

[Procedures of EDX Measurement]

The sample was fixed on a sample table, and measured for from C to Hg by EDX, and the detected elements were quantified based on the strength against a predetermined standard sample. The measurement conditions were voltage: 15 kV, emission current: 10 μA, and measurement time: 100 seconds.

For the elements detected by EDX, the weight constitutional ratio of the metals in the sample was calculated based on the strength against the predetermined standard sample. Namely, the constitutional ratio in the sample was quantified for the detected elements except for C and O, and the amounts of the elements included in the sample were calculated on the assumption that Al, Ca and Fe were present as $Al_2O_3$, CaO and $Fe_2O_3$, respectively. The metal amount of Fe as obtained is approximately the same amount as the amount that is calculated from the amount used for the preparation of the sample.

Alternatively, the composition of the metal elements can also be measured by subjecting the sample to alkali fusion and acid dissolution to give a sample solution, and using an ICP optical emission spectrometer (SPS5000, manufactured by Seiko Instruments Inc.).

The carbon monoxide reducing ability was tested by a similar method to that of Example 4 for resultant Samples 8, 11, 13, 14 and 16. The results are shown in FIG. 4. In FIG. 4, the circles show the data for the carbon monoxide reducing agent free from iron (Sample 8), the solid diamonds show the data for the carbon monoxide reducing agent comprising 0.7% by weight of iron (Sample 13), the squares show the data for the carbon monoxide reducing agent comprising 1.3% by weight of iron (Sample 11), the triangles show the data for the carbon monoxide reducing agent comprising 5.2% by weight of iron (Sample 14), and the open diamonds show the data for the carbon monoxide reducing agent comprising 0.7% by weight of iron (Sample 16).

As is apparent from FIG. 4, it was found that the carbon monoxide reducing ability was further improved in Samples 11, 13, 14 and 16 that comprised iron in the carbon monoxide reducing agent as compared to Sample 8 that did not comprise iron. Furthermore, it was also found that the carbon monoxide reducing ability was further improved as the amount of the iron included increased and the carbon monoxide reducing ability was improved as the temperature raised in Samples 11, 13, 14 and 16. Moreover, it was also found from the comparison of Sample 13 and Sample 16 that the carbon monoxide reducing ability tended to be improved more when iron was added after sintering.

Example 6

The effect of the structure of the carbon monoxide reducing agent on the carbon monoxide reducing ability was evaluated by using Samples 2, 1 and 7 of Example 1. The samples are considered to be calcium aluminates that are represented by $(CaO)_3(Al_2O_3)_1$ for Sample 2, $(CaO)_{12}(Al_2O_3)_7$ for Sample 1, and $(CaO)_1(Al_2O_3)_6$ for Sample 7, respectively. The relationships between the temperature and the outlet carbon monoxide concentration for Samples 2, 1 and 7, respectively, are shown in FIG. 5. In the figure, the diamonds represent Sample 2, the circles represent Sample 1, and the triangles represent Sample 7.

It was found from FIG. 5 that carbon monoxide was reduced more effectively when the calcium aluminate represented by $(CaO)_{12}(Al_2O_3)_7$ was used.

As described above, according to the present invention, a smoking article by which the amount of generated carbon monoxide can be reduced can be provided by adding a carbon monoxide reducing agent comprising particles comprising a calcium aluminate represented by the formula $(CaO)_m(Al_2O_3)_n$, where $1/6 \leq m/n \leq 4/1$, wherein the particles have a BET specific surface area of 2 m²/g or more and less than 20 m²/g. The carbon monoxide reducing agent to be added to the smoking article of the present invention can convert carbon monoxide to carbon dioxide efficiently when it is heated to 450° C. or higher that is approximately the temperature during combustion of a tobacco. Therefore, the smoking article of the present invention can reduce the carbon monoxide concentration in mainstream smoke during smoking and in sidestream smoke during natural combustion. Furthermore, the carbon monoxide reducing agent has higher ability to remove carbon monoxide at a lower temperature area of about 450° C. as compared to calcium carbonate that is generally used for a wrapping paper of a smoking article. Moreover, a carbon monoxide reducing agent that is excellent in cost performance can be prepared by incorporating a relatively inexpensive metal into a calcium aluminate. Since the carbon monoxide reducing agent used in the present invention does not have a nanoparticle size, it is excellent in handling in the manufacture of a smoking article.

What is claimed is:

1. A smoking article comprising a carbon monoxide reducing agent comprising particles comprising calcium aluminate represented by the formula $(CaO)_m(Al_2O_3)_n$, where $1/6 \leq m/n \leq 12/7$, wherein the particles have a BET specific surface area of 2 m²/g or more and less than 20 m²/g.

2. The smoking article according to claim 1, wherein the particles have at least one kind of additional metal other than calcium and aluminum.

3. The smoking article according to claim 2, wherein the at least one kind of additional metal is present on the surfaces of the particles and/or in the particles.

4. The smoking article according to claim 2, wherein the at least one kind of additional metal is selected from the group consisting of Au, Pt, Mg, Si, P, K, Ti, Cr, Mn, Fe, Co, Ni, Cu, Zn, Zr, Mo, Pd and Ag.

5. The smoking article according to claim 2, wherein the additional metal is Fe.

6. The smoking article according to claim 2, wherein the at least one kind of additional metal is present in an amount of 0.1% by weight or more and less than 10% by weight in total with respect to the weight of the carbon monoxide reducing agent.

7. The smoking article according to claim 1, wherein the smoking article comprises a tobacco filler, and the carbon monoxide reducing agent is present in an amount of from 1 to 80% by weight with respect to the weight of the tobacco filler.

8. The smoking article according to claim 1, wherein the smoking article comprises a tobacco wrapping paper, and the carbon monoxide reducing agent is present in an amount of from 1 to 60% by weight with respect to the weight of the tobacco wrapping paper.

9. A method of manufacturing the smoking article according to claim 1, comprising:
(a) manufacturing a tobacco filler;
(b) manufacturing a tobacco wrapping paper;
(c) adding water, a swelling agent and a flavor to the tobacco filler;
(d) forming a tobacco column from the tobacco filler; and
(e) wrapping the tobacco column in the tobacco wrapping paper to form a tobacco rod,
wherein the carbon monoxide reducing agent is added to the tobacco filler and/or tobacco wrapping paper in any of the steps (a) to (e) and
wherein the carbon monoxide reducing agent comprises particles comprising calcium aluminate represented by the formula $(CaO)_m(Al_2O_3)_n$, where $1/6 \leq m/n \leq 12/7$, said particles having a BET specific surface area of 2 m²/g or more and less than 20 m²/g.

10. The method according to claim 9, wherein the carbon monoxide reducing agent is added to the tobacco filler and/or tobacco wrapping paper by coating, kneading, paper-making, spraying, sprinkling or immersing.

11. The method according to claim 9, further comprising adding an additional metal other than calcium and aluminum on surfaces of the particles comprising calcium aluminate by a wet process using a non-aqueous solvent.

12. The method according to claim 11, wherein the particles comprise an additional metal other than calcium and aluminum therein.

13. The method according to claim 11, wherein the additional metal is added so as to be less than 10% by weight with respect to the weight of the carbon monoxide reducing agent.

14. The method according to claim 11, wherein the additional metal is added so as to be from 0.1% by weight to less than 5% by weight with respect to the weight of the carbon monoxide reducing agent.

* * * * *